US006356284B1

(12) United States Patent
Manduley et al.

(10) Patent No.: US 6,356,284 B1
(45) Date of Patent: Mar. 12, 2002

(54) OPERATING SYSTEM-INDEPENDENT GRAPHICAL USER INTERFACE WITH SLIDING PANEL

(75) Inventors: Debra Manduley; Timothy Lowery; Joseph Nebel, all of San Diego, CA (US)

(73) Assignee: Powerware Corporation, Raleigh, NC (US)

( * ) Notice: Subject to any disclaimer, the term of this patent is extended or adjusted under 35 U.S.C. 154(b) by 0 days.

(21) Appl. No.: 09/280,410

(22) Filed: Mar. 29, 1999

(51) Int. Cl.[7] .............................................. G06K 15/00
(52) U.S. Cl. ...................................... 345/779; 345/805
(58) Field of Search ................................ 345/779, 772, 345/762, 833, 736, 746; 111/797, 805, 792, 749; 395/710

(56) References Cited

U.S. PATENT DOCUMENTS

| 5,432,925 A | * 7/1995 | Abraham et al. ........... 395/500 |
| 5,586,244 A | * 12/1996 | Berry et al. ................ 345/779 |
| 5,596,690 A | * 1/1997 | Stone et al. ................ 345/805 |
| 5,640,537 A | * 6/1997 | Jessen et al. ............... 345/736 |
| 5,657,049 A | 8/1997 | Ludolph et al. ............. 345/145 |
| 5,704,050 A | * 12/1997 | Redpath ...................... 345/779 |
| 5,901,319 A | * 5/1999 | Hirst ........................... 395/710 |
| 5,914,716 A | * 6/1999 | Rubin et al. ................ 345/797 |
| 6,151,023 A | * 11/2000 | Chari .......................... 345/736 |
| 6,215,490 B1 | * 4/2001 | Kaply ......................... 345/797 |

* cited by examiner

*Primary Examiner*—Steven Sax
(74) *Attorney, Agent, or Firm*—Myers Bigel Sibley & Sajovec

(57) ABSTRACT

Systems, methods and computer program products are provided for displaying a graphical user interface (GUI) within a display device of a computer, wherein GUI functions are provided independently of the computer operating system. GUI controls are configured to inherit at least one style property, such as color, shape and typography, from the operating system in order to maintain the look and feel of the particular operating system. A first panel, having a display area configured to display information associated with an application program executing within the computer, is displayed within the operating system desktop (or browser window). A second panel is displayed within the desktop (or browser window) and is positioned beneath the first panel. The second panel is movably associated with the first panel between a hidden position beneath the first panel and an exposed position adjacent the first panel.

81 Claims, 12 Drawing Sheets

OPERATING SYSTEM-INDEPENDENT GRAPHICAL USER INTERFACE WITH SLIDING PANEL

FIELD OF THE INVENTION

The present invention relates generally to data processing systems and, more particularly, to graphical user interfaces for data processing systems.

BACKGROUND OF THE INVENTION

An operating system is a program that, after being initially loaded into a computer by a bootstrap program, manages application programs that perform various data processing tasks. Application programs make use of an operating system by making requests for services through a defined application program interface (API). Examples of application programs include word processors, database programs, web browsers, image editing programs, and communication programs. UNIX® and Windows 95® are well known examples of operating systems.

The first interactive user interfaces for computers were text-oriented interfaces in which users typed various commands. The command interface of the Microsoft® Disk Operating System (MS-DOS) is an example of a text-oriented user interface. By contrast, many operating systems today utilize a graphical user interface (GUI) having a "window-like" workspace (often referred to as a "desktop") for displaying application programs, operating system information such as directory information, and program groupings. An exemplary desktop 10 for the Windows 95® operating system is illustrated in FIG. 1. FIG. 2 illustrates a GUI 12 for an application program displayed within the Windows 95® operating system desktop 10. A word processing application program is associated with the illustrated GUI 12.

A GUI control is an element (also referred to as a "widget") that displays information with a GUI or provides a specific way for a user to interact with an operating system and/or with an application program via a GUI. GUI controls may include iconic text buttons, pull-down menus, selection boxes, progress indicators, on-off checkmarks, scroll bars, windows, toggle buttons, forms, and many other devices for displaying information and for inviting, accepting, and responding to user actions within a GUI.

As is known to those skilled in the art, user actions within a GUI are typically performed with an input device, such as a mouse, and a corresponding screen pointer. A mouse, or other mechanical-electrical device, translates two-dimensional movement into two-dimensional screen position movement. When a mouse is moved freely on a surface, a pointer on a screen typically moves in a similar and proportional manner. A mouse typically has one or more push buttons which can be used to effectuate control over a cursor pointer by selecting or deselecting specific GUI controls and other objects. A cursor pointer is typically "activated" when a mouse button is depressed and remains active until the button is released. Pointer activation may also be initiated by sequences of mouse button presses, such as a "double click" or rapid button press twice in sequence.

The illustrated application program GUI 12 of FIG. 2 includes GUI controls 14a, 14b for minimizing and maximizing the size of the application program GUI 12, respectively. A GUI control 14c is also provided for closing and removing the application program GUI 12 from the desktop 10. A plurality of GUI controls are also provided within toolbars 16a, 16b, as illustrated. For example, GUI control 17 is provided for printing a document from the application program displayed within the application program GUI 12. GUI control 18 is provided for underlining portions of text within a document in the application program displayed within the application window 12.

Conventional GUIs typically rely heavily upon a window manager system of an operating system desktop within which a GUI is deployed for supplying and supporting various GUI controls. As a result, a GUI designed for display and operation within the Windows 95® operating system may not be displayable or operable within a UNIX® operating system. Separate, operating system-specific GUI code is typically necessary to implement a GUI within different operating system desktops. In addition, because operating systems can allow multiple application programs to execute at the same time within a computer, it is often desirable for GUIs associated with an application program to share display screen space.

SUMMARY OF THE INVENTION

In view of the above, it is an object of the present invention to facilitate the implementation of a GUI for an application program that can be utilized within multiple operating systems and web browsers.

It is another object of the present invention to facilitate conservation of screen space when a GUI is displayed via a display device.

These and other objects of the present invention are provided by systems, methods and computer program products for displaying a graphical user interface (GUI) within a display device of a computer, wherein GUI functions are entirely self-contained within the GUI and are independent of the computer operating system. A first panel, having a display area configured to display information associated with an application program executing within the computer, is displayed within the operating system desktop (or browser window). A second panel is displayed within the desktop (or browser window) and is positioned beneath the first panel. The second panel is movably associated with the first panel between a hidden position beneath the first panel and an exposed position adjacent the first panel. A slider object or tab is responsive to user-performed dragging operations via a pointer for moving the second panel between hidden and exposed positions.

At least one GUI control is provided on the first and second panels and is independent of the computer operating system within which the GUI is running. Each GUI control is configured to control display of information associated with the application program within the first panel display area. Furthermore, each GUI control naturally inherits at least one style property, such as color, shape and typography, from the operating system thereby maintaining the look and feel of the particular operating system. In response to user actions, the second panel is movable between hidden and exposed positions. GUI controls according to the present invention are independent of the operating system because they are not obtained from the operating system window frame (i.e., the GUI controls are not provided by the window manager of the windowing system of the operating system). However, GUI controls within a GUI according to the present invention can have the visual style of the operating system.

Because GUIs according to the present invention are provided independently of an operating system, GUI consistency can be maintained no matter what operating system the GUI is running within. Accordingly users need only learn to use a single GUI no matter how many operating systems or browsers they are required to use. Although GUI functionality is independent of an operating system, look and feel of an operating system within a GUI according to the present invention can be maintained.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code means embodied in the medium. Any suitable computer readable medium may be utilized including, but not limited to, hard disks, CD-ROMs, optical storage devices, or magnetic storage devices.

Computer program code for carrying out operations of the present invention is preferably written in an object oriented programming language such as JAVA®, Smalltalk or C++. However, the computer program code for carrying out operations of the present invention may also be written in conventional procedural programming languages, such as the "C" programming language, or in a functional (or fourth generation) programming language such as Lisp, SML, or Forth.

JAVA® is an object-oriented programming language developed by Sun Microsystems, Mountain View, Calif. JAVA® is a portable and architecturally neutral language. JAVA® source code is compiled into a machine-independent format that can be run on any machine with a JAVA® runtime system known as the JAVA® Virtual Machine (JVM). The JVM is defined as an imaginary machine that is implemented by emulating a processor through the use of software on a real machine. Accordingly machines running under diverse operating systems, including UNIX®, Windows 95®, Windows NT®, and MacIntosh® having a JVM can execute the same JAVA® program.

Figure 1:
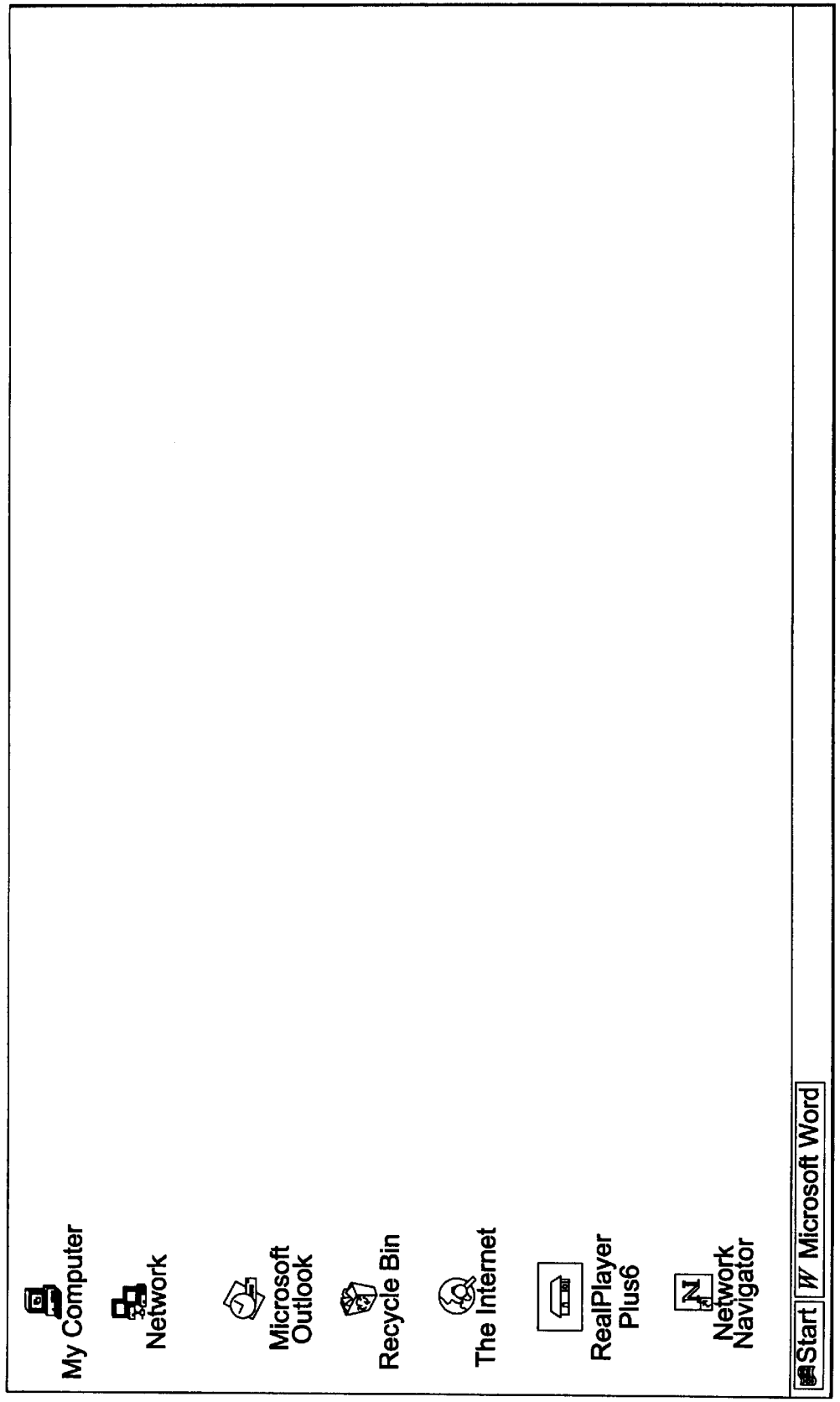
FIG. 1 illustrates an exemplary desktop for the Windows 95® operating system.
Figure 2:
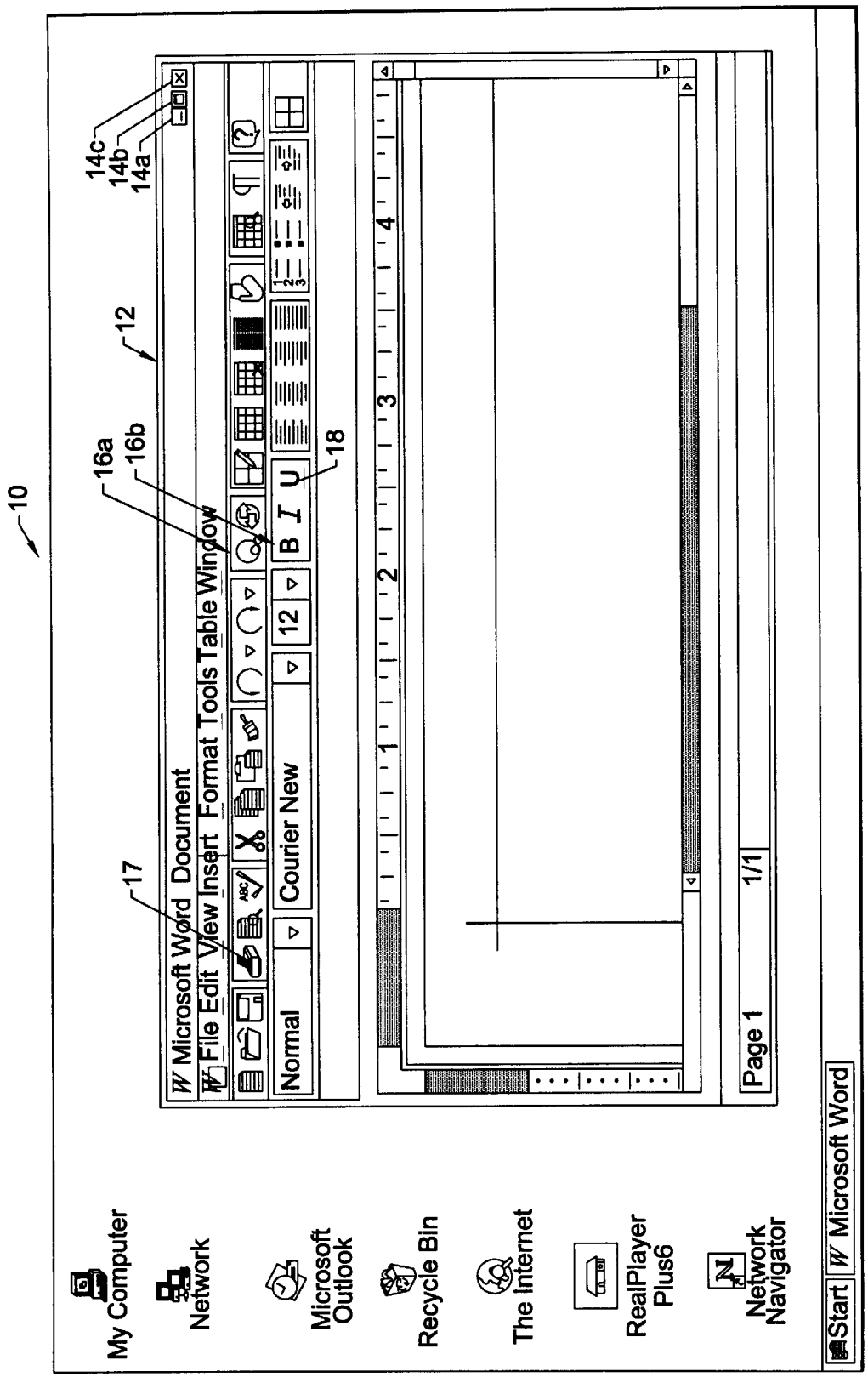
FIG. 2 illustrates an application program GUI displayed within the Windows 95® operating system desktop of FIG. 1.
Figure 3A:
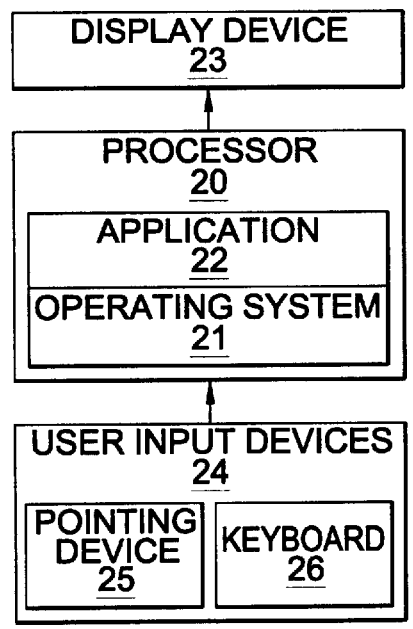
FIG. 3A illustrates a data processing system in which the present invention may be utilized.

FIG. 3A illustrates a data processing system in which the present invention may be utilized. As seen in FIG. 3A, a data processor 20 may have an operating system (such as UNIX®, Windows 95®, Windows NT®, and the like) 21 resident therein. An application program 22 may be running on the operating system 21. The processor 20 displays information on a display device 23. The display device 23 has a plurality of picture elements (collectively referred to as a screen) which may define the appearance of a GUI displayed on the display device 23. The contents of the screen 23 and, therefore, the appearance of the GUI, may be controlled or altered by the application program 22 or the operating system 21, either individually or in combination. For obtaining input from a user, the operating system 21, the application program 22, or both, may utilize user input devices 24. User input devices 24 may include a pointing device 25 and a keyboard 26 or other input devices known to those of skill in the art.

Exemplary data processing systems in which the present invention may be utilized include, but are not limited to, Sun Microsystems®, Apple®, IBM®, and IBM®-compatible personal computers and workstations. However, it is to be understood that various computing devices and processors may be utilized to carry out the present invention without being limited to those enumerated herein.

Exemplary operating systems within which the present invention may be utilized include, but are not limited to, UNIX®, Windows 95®, Windows 95®, and Windows NT®. Exemplary Web browsers for both Internet and intranet use include Netscape Navigator® (Netscape Communications Corporation, Mountain View, Calif.) and Internet Explorer® (Microsoft Corporation, Redmond, Wash.). Web browsers typically provide a graphical user interface for retrieving and viewing information, applications and other resources hosted by Internet/intranet servers (hereinafter collectively referred to as "web servers" or "web sites"). Preferably, a JVM 1.1.5 or higher is running on a data processing system implementing the present invention.

A GUI according to the present invention will now be described in detail with respect to an Uninterruptible Power Supply (UPS) device monitoring program executing within a computer. The illustrated embodiment is for illustrative purposes only and does not limit the scope of the present invention. The UPS device monitoring program is but one of many types of application programs with which a GUI according to the present invention may be utilized. GUIs according to the present invention may be associated with virtually any type of application program executing within a data processor.

An Uninterruptible Power Supply (UPS) device is a device that is typically located between a power source (e.g., a wall outlet) and an electronic device (e.g., a computer) to prevent undesired features of the power source (outages, sags, surges, bad harmonics, etc.) from adversely affecting the performance of the electronic device. When used in a computing environment, a UPS device may be monitored using monitoring software. UPS device monitoring software typically must be configured to run on many different operating systems and hardware platforms. This typically means that different software code is required for each operating system. As a result, this typically means that, for each operating system, a user may be presented with a different user interface for the monitoring software.

Figure 3B:
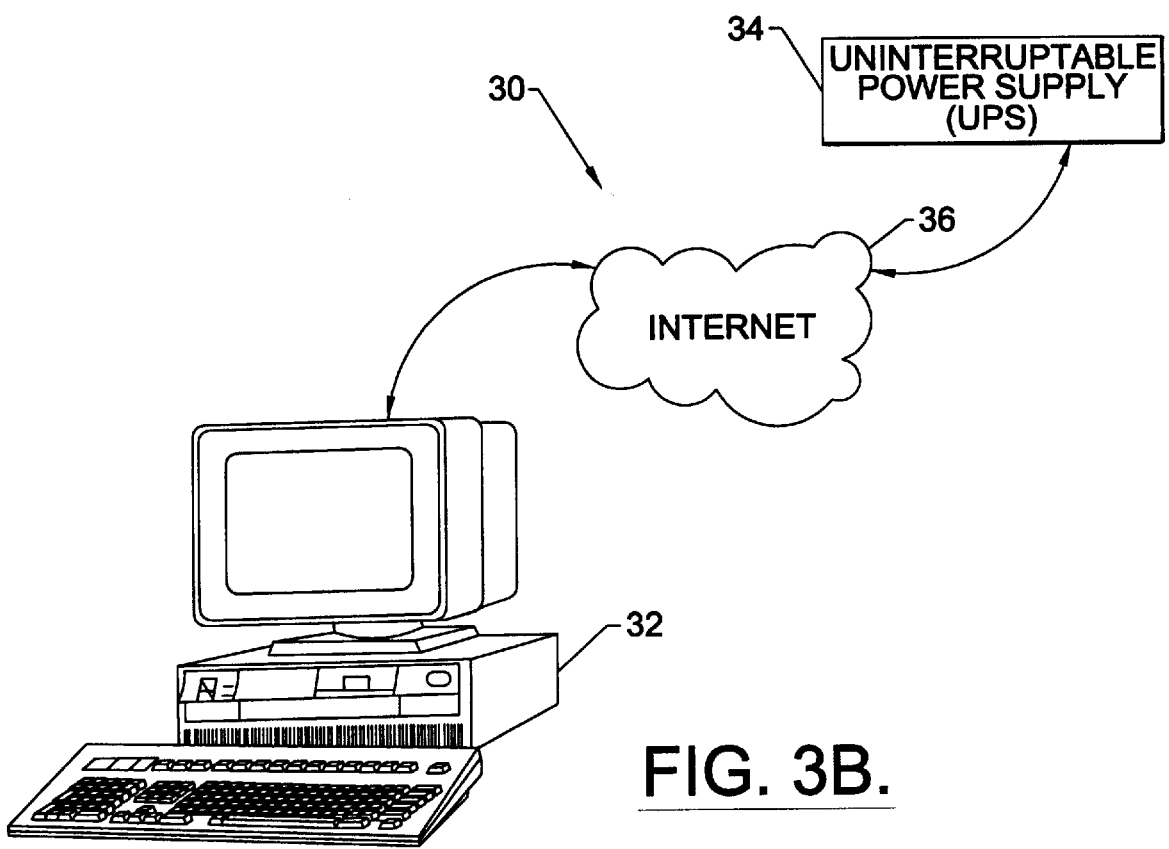
FIG. 3B illustrates a data processing system wherein a computer having a GUI according to the present invention is in communications with, and monitoring, a remotely located uninterruptible power supply (UPS) device.

UPS monitoring software is typically configured to monitor various conditions of a UPS device and display real-time information about these conditions. Exemplary UPS devices include the Prestige and NetUPS product lines available from Powerware Corporation/Exide Electronics, Inc., 2727 Kurtz St., San Diego, Calif. 92110. Exemplary UPS monitoring software includes the Talon UPS Status application, also available from Powerware Corporation/Exide Electronics, Inc. A monitored UPS may be located locally or remotely with respect to the UPS monitoring software. Preferably, a UPS device is assigned an Internet Protocol (IP) address and is in communications with a computer executing UPS monitoring software via a Transmission Control Protocol/Internet Protocol (TCP/IP) connection. However, communications may be established between a UPS device and UPS monitoring software executing on a computer in various ways known to those skilled in the art. FIG. 3B illustrates a data processing system 30 wherein a computer 32 having a GUI according to the present invention is in communication with a remotely located UPS device 34 via the Internet 36.

Figure 4:
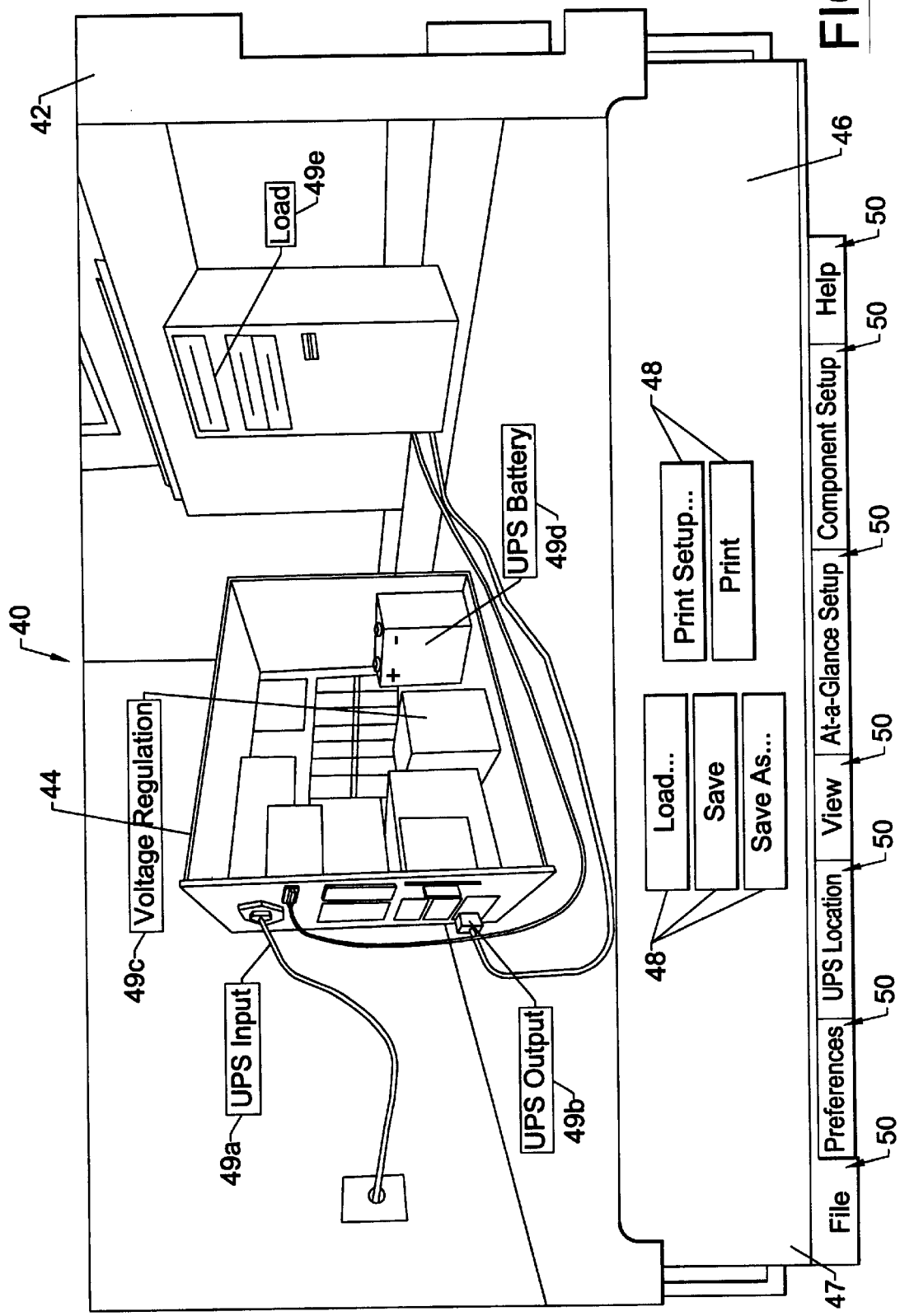
FIG. 4 illustrates an operating system independent GUI according to an embodiment of the present invention.

Referring now to FIG. 4, a GUI 40 according to one embodiment of the present invention is illustrated. The illustrated GUI 40 includes a first panel 42 having a display area 44 that is configured to display information associated with an application program, such as a UPS monitoring program, executing within a computer. The GUI also includes a second panel 46 positioned beneath the first panel 42 and movably associated therewith. As will be described below, the second panel 46 is movable between a hidden position beneath the first panel 42 and an exposed position adjacent the first panel 42.

The second panel 46 includes a plurality of GUI controls 48 for controlling the display of information from an application program within the first panel display area 44. The illustrated GUI controls 48 in FIG. 4 are pushbutton controls. However, as will be illustrated below, various types of GUI controls may be utilized without limitation. The second panel 46 also includes a plurality of GUI controls (tabs) 50 extending from an edge portion 47 thereof, as illustrated. The tabs 50 are preferably visible to a user when the second panel 46 is in hidden and exposed positions. Each of the illustrated GUI controls 48, 50 may also be repeated within a menu bar of an operating system desktop within which the GUI 40 is running.

Each GUI control 48, 50 provided within the GUI 40 is functionally independent of an operating system (specifically a windows manager within an operating system) within which the GUI 40 is running. This means that all program code that provides functionality to a GUI control is completely contained within a GUI according to the present invention. GUI controls according to the present invention do not require any functional support from an operating system or any other source external to a GUI within which they are associated with. As a result, GUIs according to the present invention are self-contained objects that are independent of an operating system (or browser) within which they are running. GUI controls within a GUI according to the present invention can adapt to operating system control styles but are not reliant on a window frame provided by the operating system.

With respect to the illustrated embodiment of the present invention, when used in conjunction with UPS device monitoring software, a GUI 40 according to the present invention may display data within the display area 44 of the first panel 42 in "at-a-glance" mode or in "component view" mode. FIG. 4 illustrates "at-a-glance" mode wherein an overall view of a monitored UPS device and its various components is provided in "cutaway" detail. In the illustrated embodiment of FIG. 4, five aspects (or components) of a UPS device that can be monitored are labeled via the following GUI controls: UPS Input 49a, UPS Output 49b, Voltage Regulation 49c, UPS Battery 49d, and Load 49e. By activating one of the illustrated GUI controls 49a–49e, real-time information for a monitored UPS device will be displayed within the first panel display 44.

Figure 5:
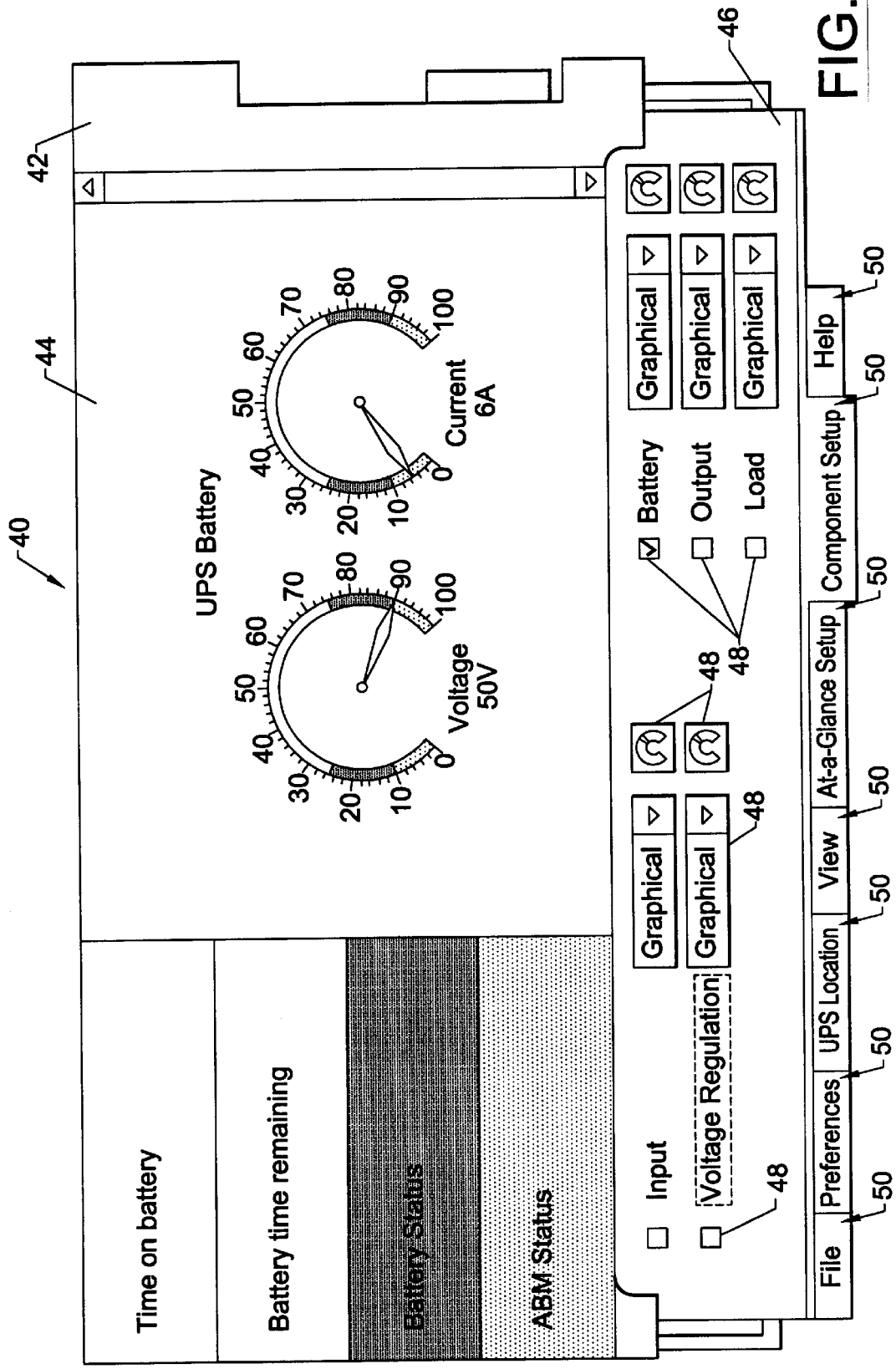
FIG. 5 illustrates a GUI according to an embodiment of the present invention wherein real-time information for a monitored UPS device is displayed within a first panel display and a second panel is in an exposed position.

For example, if the GUI control "UPS Battery" 49d is activated, real-time information about a UPS battery is displayed in the first panel display area 44, as illustrated in FIG. 5. Each component of a UPS device may have a predefined set of meters and values associated therewith that are displayed when a respective GUI control 49a–49e is selected as illustrated below in Table 1.

TABLE 1

| UPS Component | Voltage Regulation | UPS Battery | UPS Output | Load |
|---|---|---|---|---|
| Input | Boost | ABM Status: | Output Freq. | Percentage |
| Frequency Input Voltage Input Current | Buck Double Boost Normal | * Charging * Resting * Floating * Discharging Battery Status | Output Voltage Output Current | of Load Capability in Use |
|  |  | * Normal * Low Time On Battery Estimated Min. Remaining On Battery Battery Voltage Battery Current |  |  |

Various colors, as well as sound, may also be utilized to enhance a user's understanding of information displayed within the first panel display area 44.

Still referring to FIG. 5, GUI controls 48 within the second display panel 46 can allow users to select other UPS device components so that respective information can be displayed within the first panel display area 44. In addition, various GUI controls 48 can allow a user to select how the information is to be displayed.

Figure 6:
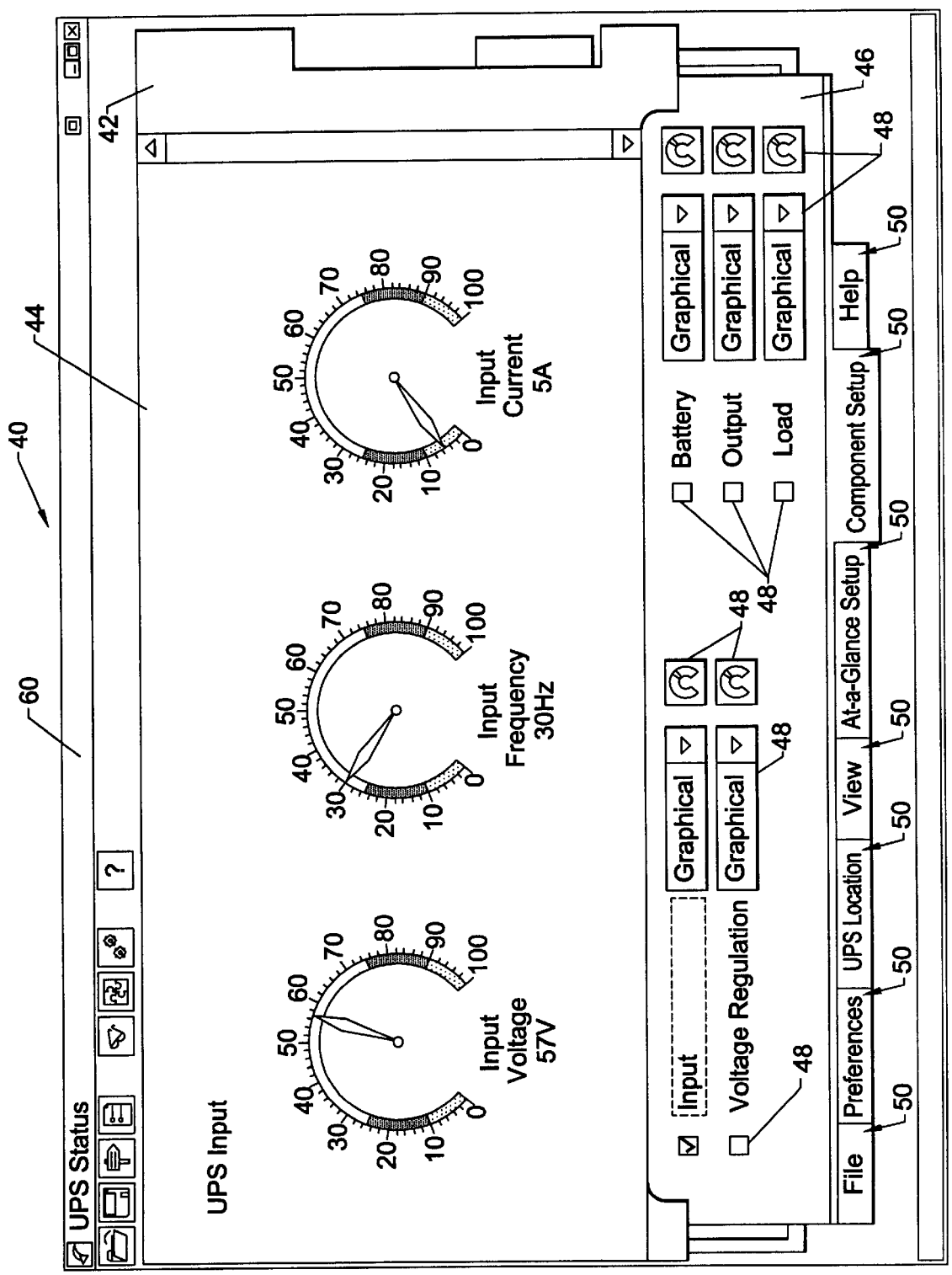
FIGS. 6–9 provide examples of GUI controls inheriting style properties from operating systems within which a GUI according to the present invention is running.
Figure 7:
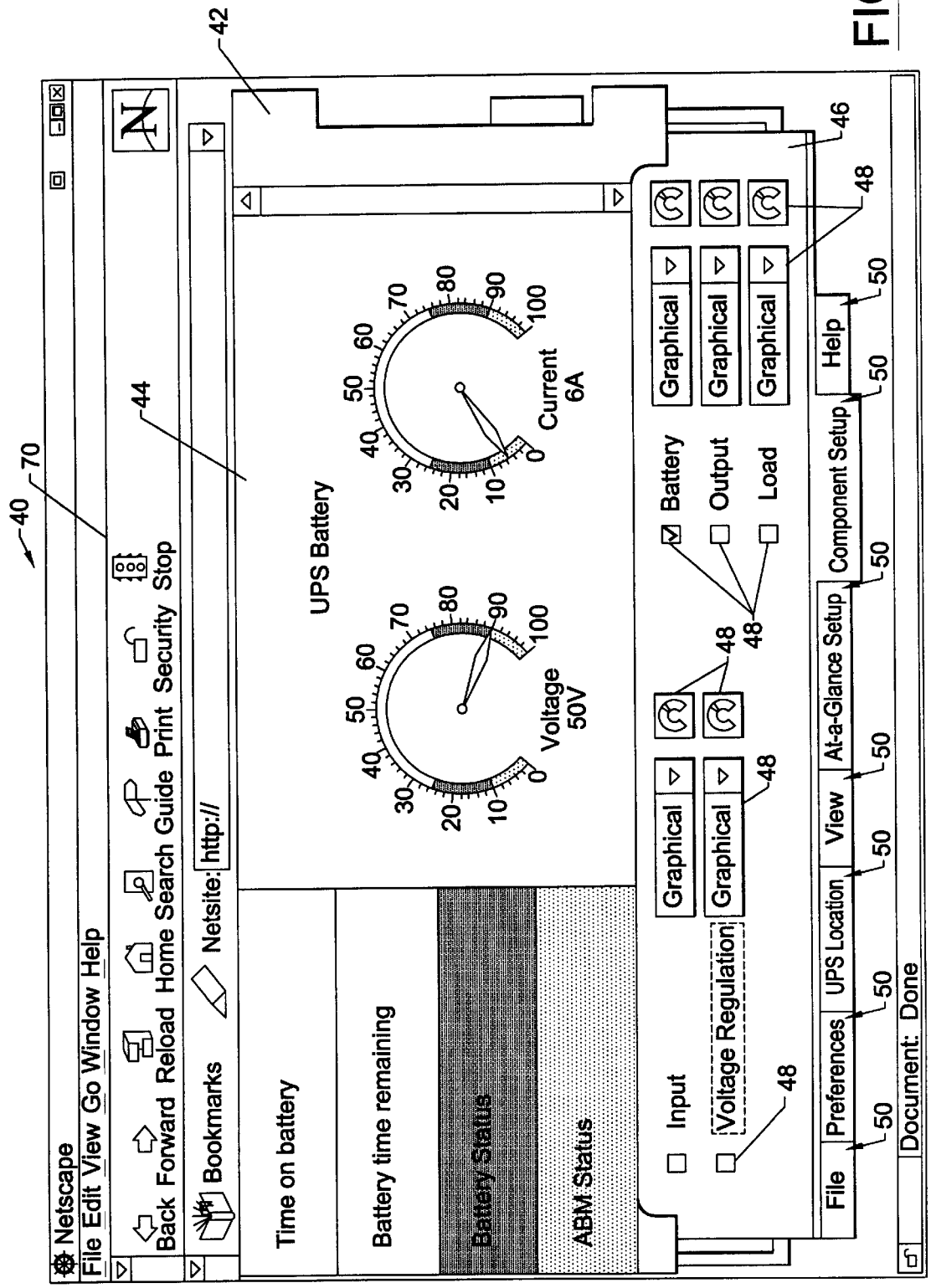
Figure 8:
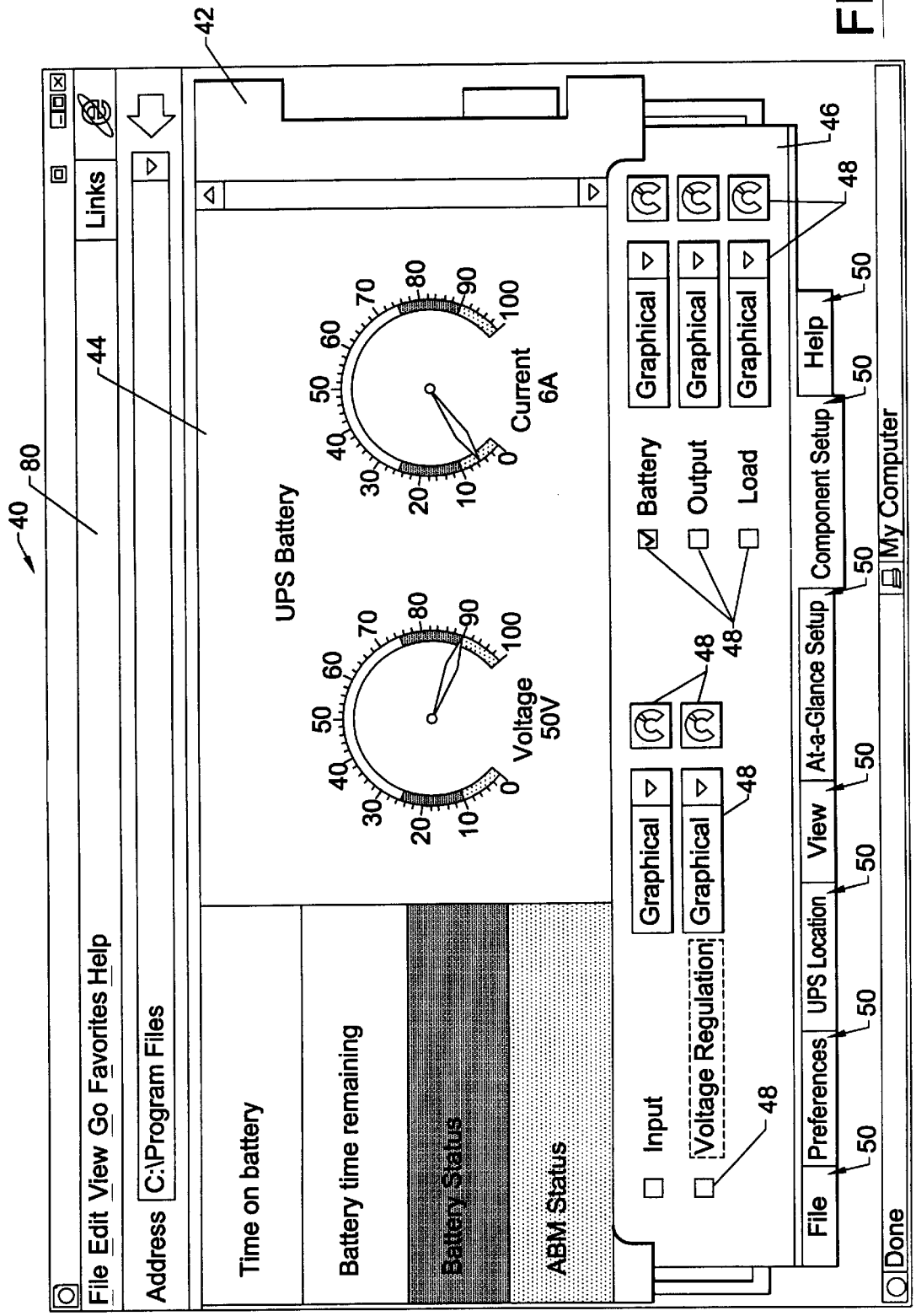
Figure 9:
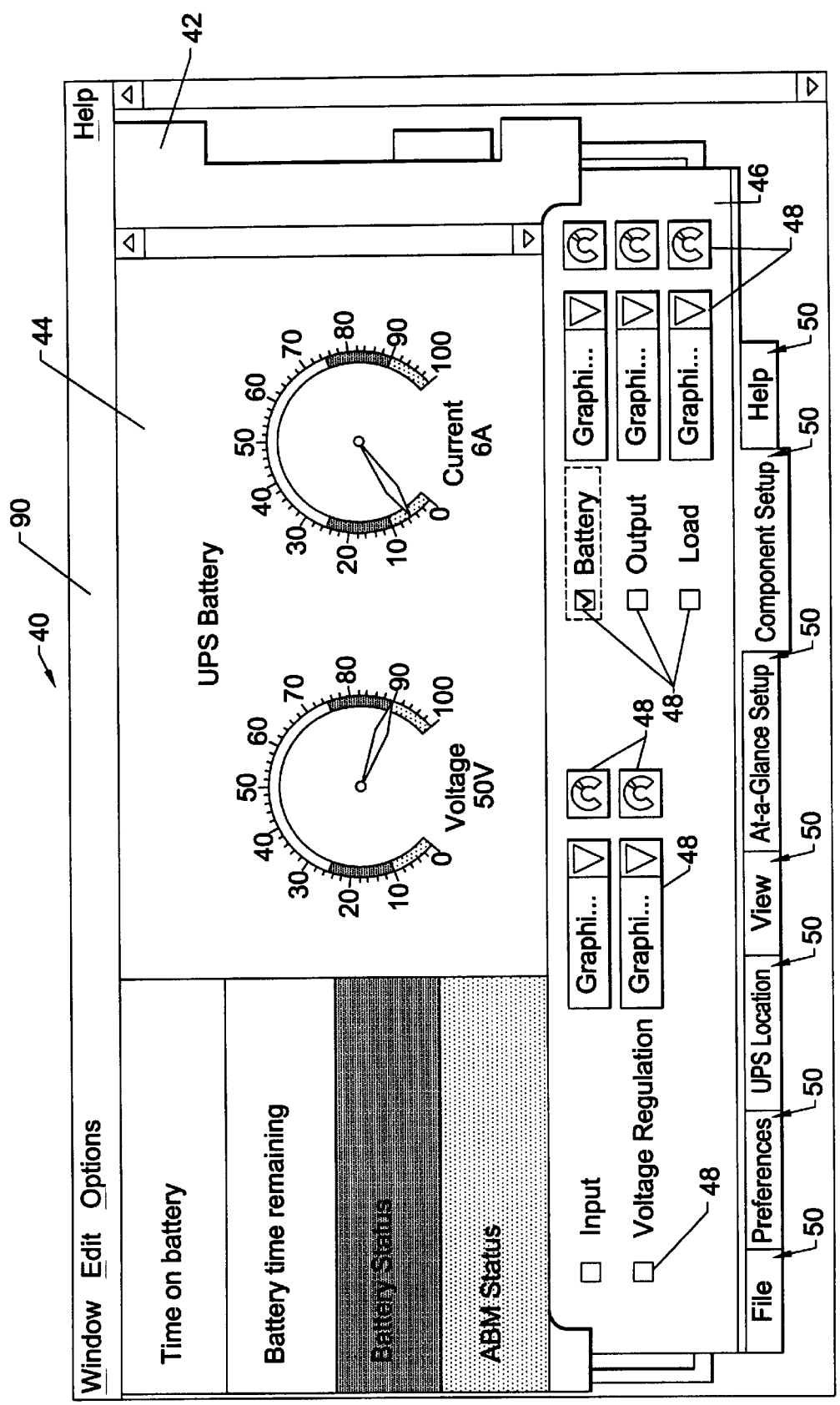

A GUI according to the present invention can allow GUI controls utilized therewithin to inherit at least one style property from an operating system (or browser) within which the GUI is executing. Exemplary style properties include, but are not limited to, color, shape and typography. Referring to FIGS. 6–9, examples of GUI controls inheriting style properties from an operating system (or browser) within which a GUI 40 according to the present invention is running are illustrated. FIG. 6 is an example of a GUI 40 in a Microsoft Windows 98® window frame 60. The illustrated GUI controls 48, 50, 49a–49e have inherited style properties of Windows 98® to adapt the "look and feel" of Windows 98®. FIGS. 7 and 8 are examples of a GUI 40 in a Netscape Navigator® Web browser window 70 and a Microsoft Explorer® Web browser window 80, respectively. FIG. 9 is an example of a GUI 40 in a UNIX® Motif window frame 90. The illustrated GUI controls 48, 50, 49a–49e have inherited style properties of the Motif window frame 90 to adapt the "look and feel" of UNIX®.

Figure 10A:
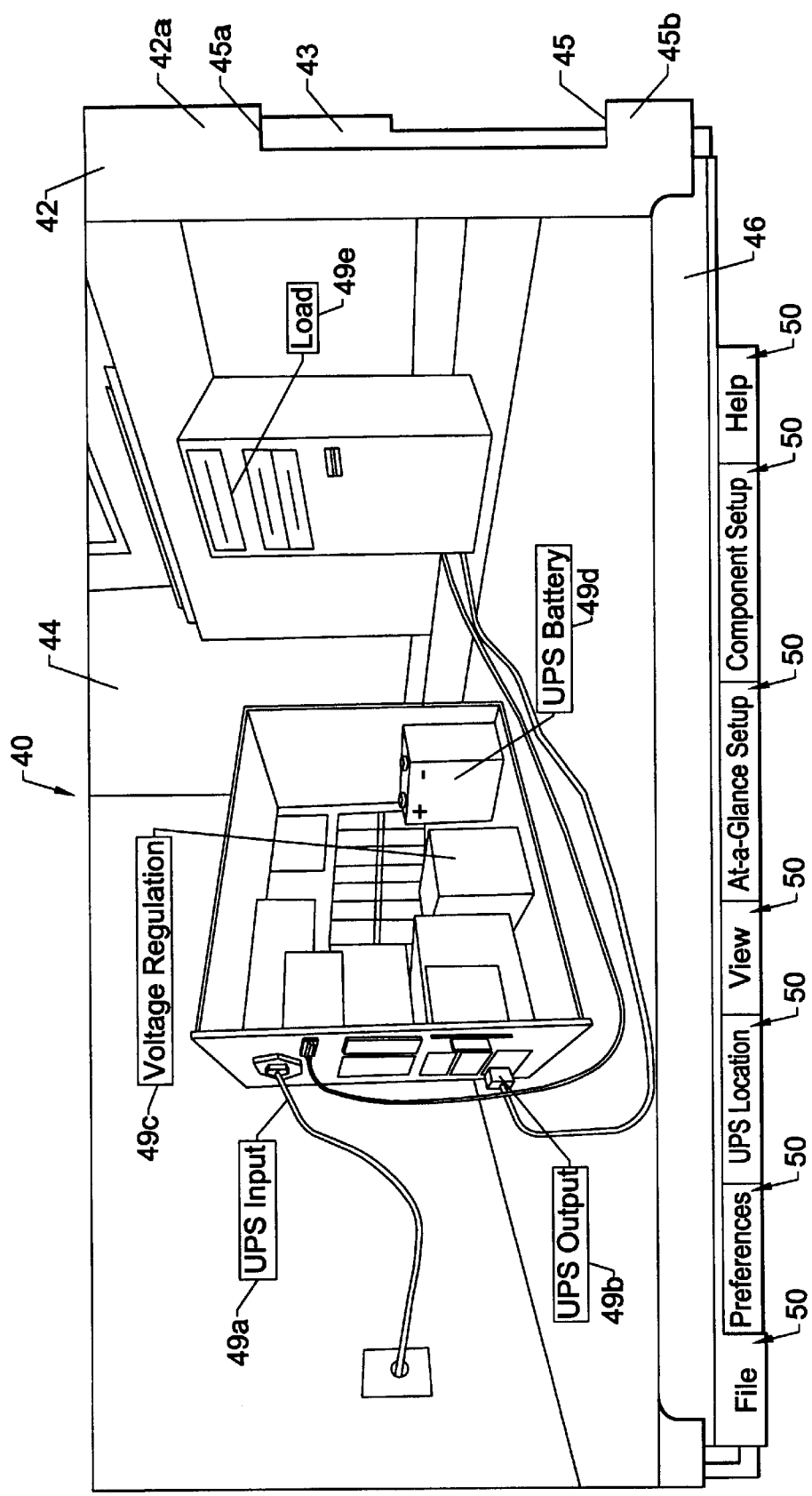
FIGS. 10A and 10B illustrate movement of a second panel from a hidden position to an exposed position within a GUI according to an embodiment of the present invention.
Figure 10B:
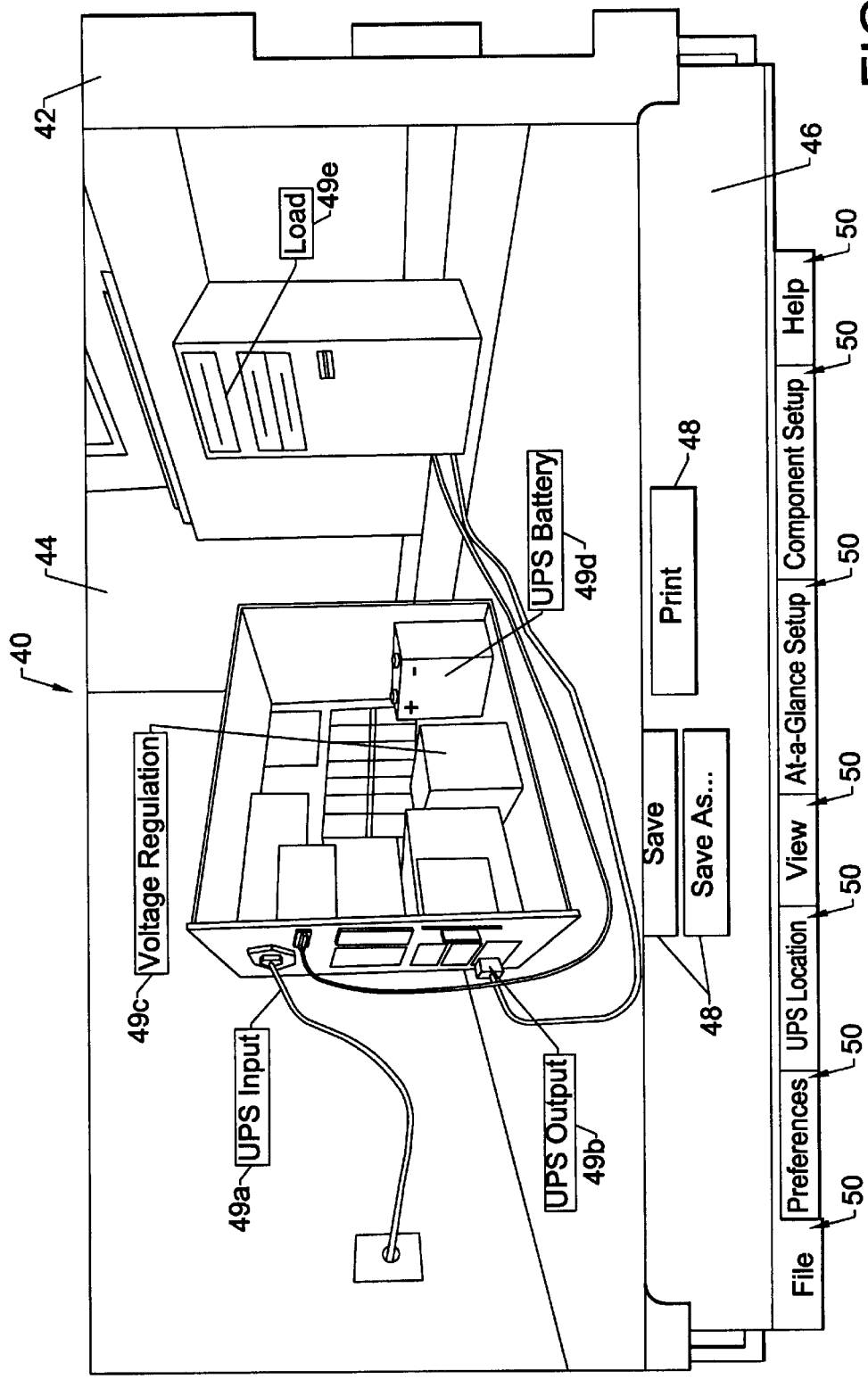

Referring now to FIGS. 10A and 10B, the second panel 46 of a GUI 40 according to the present invention is movable in response to user actions between a hidden position beneath the first panel 42 (FIG. 10A) and an exposed position adjacent the first panel 42 (FIG. 10B). A slider object or tab 43, positioned within a slot (or recessed portion) 45 along an edge portion 42a of the first panel 42, is movable, in response to user actions, between first and second positions. The tab 43 serves as means for moving the second panel 46 between the hidden and exposed positions. Dragging operations with a mouse or other pointing device can serve as means for moving the tab 43 between first and second positions. The second panel 46 may be configured to initially appear in either a hidden or exposed position.

In the illustrated GUI 40, the second panel 46 is in the hidden position when the tab 43 is in the first position adjacent the upper end 45a of the slot 45 (FIG. 10A). The second panel 46 is in the exposed position when the tab 43 is in the second position adjacent the lower end 45b of the slot 45. FIG. 10B illustrates the tab 43 in between the first and second positions such that the second panel 46 is partially visible.

In addition, user activation of a tab 50 may serve as means for moving the second panel 46 between hidden and exposed positions. By activating a tab 50 when the second panel 46 is in the hidden position, the second panel 46 is configured to move from a hidden position to an exposed position.

The present invention will now be described with reference to a flowchart illustration (FIG. 11) of methods, apparatus (systems) and computer program products according to an embodiment of the invention. It will be understood that each block of the flowchart illustration of FIG. 11 and combinations of blocks in the flowchart illustrations of FIG. 11, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

The computer program instructions may be executed by a processor to cause a series of operational steps to be performed by the processor to produce a computer implemented process such that the instructions which execute on the processor provide steps for implementing the functions specified in the flowchart block or blocks. The computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks.

Figure 11:
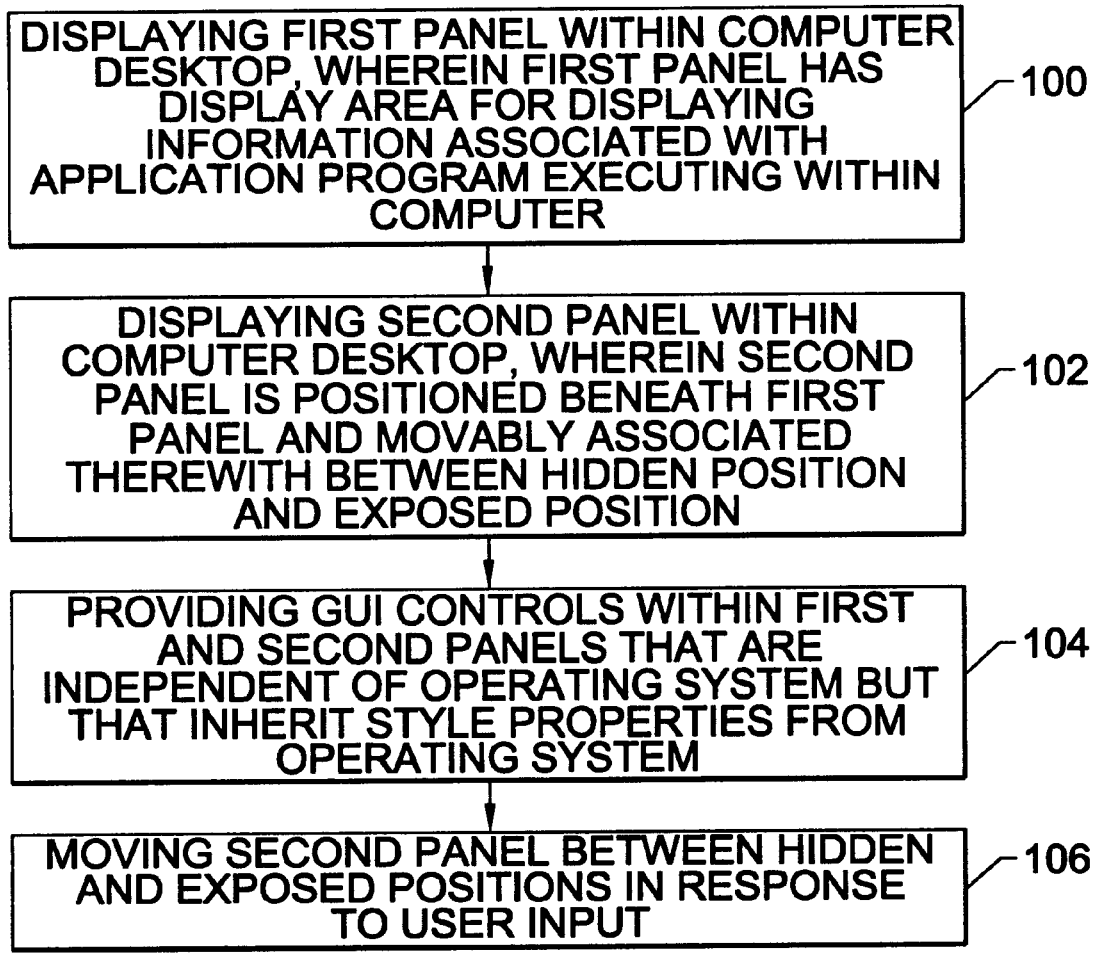
FIG. 11 illustrates operations for displaying a GUI that is independent of a computer operating system, according to the present invention.

Referring now to FIG. 11, operations, according to the present invention, for displaying a GUI within a display device of a computer, wherein the computer includes an operating system executing therewithin, and wherein a desktop is displayed within the display device by the operating system, are schematically illustrated and can be performed in any order. A first panel, having a display area configured to display information associated with an application program executing within the computer, is displayed within the desktop (Block 100). A second panel is displayed within the desktop and is positioned beneath the first panel (Block 102). As described above, the second panel is movably associated with the first panel between a hidden position beneath the first panel and an exposed position adjacent the first panel. At least one GUI control is provided on the first and second panels and is functionally independent of the computer operating system (Block 104). As described above, each GUI control is configured to control display of information associated with an application program within the first panel display area. Furthermore, each GUI control is configured to inherit at least one style property from the operating system. In response to user actions, the second panel can be moved between the hidden and exposed positions (Block 106).

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A graphical user interface (GUI) for display within a display device of a computer, wherein the computer includes an operating system executing therewithin, and wherein a desktop is displayed within the display device by the operating system, the GUI comprising:

means for displaying a first panel within the desktop, wherein the first panel comprises a display area configured to display information associated with an application program executing within the computer;

means for movably displaying a second panel within the desktop, wherein the second panel is positioned beneath the first panel and is movably associated therewith between a hidden position beneath the first panel and an exposed position adjacent the first panel;

at least one GUI control on at least one of the first and second panels, wherein the at least one GUI control is configured to control display of information associated with the application program within the first panel display area, wherein the at least one GUI control is functionally independent of the operating system, and wherein the at least one GUI control is configured to inherit at least one style property from the operating system; and means for moving the second panel between the hidden and exposed positions in response to user input.

2. A GUI according to claim 1 wherein the at least one GUI control comprises a plurality of GUI controls.

3. A GUI according to claim 1 wherein the style property is selected from the group consisting of color, shape and typography.

4. A GUI according to claim 1 wherein the second display panel comprises a set of GUI controls extending from a portion thereof that are visible to a user when the second panel is in both the hidden and exposed positions, wherein each GUI control in the set is functionally independent of the operating system, and wherein each GUI control in the set is configured to inherit at least one style property from the operating system.

5. A GUI according to claim 4 wherein the style property is selected from the group consisting of color, shape and typography.

6. A GUI according to claim 4 wherein the means for moving the second panel between the hidden and exposed positions comprises means for activating one of the GUI controls in the set.

7. A GUI according to claim 1 further comprising an object positioned adjacent the first panel, wherein the object is movable between first and second positions, wherein the second panel is in the hidden position when the object is in the first position, wherein the second panel is in the exposed position when the object is in the second position, and wherein the means for moving the second panel between the hidden and exposed positions comprises means for moving the object between the first and second positions.

8. A GUI according to claim 7 wherein the means for moving the object between the first and second positions comprises means for performing a dragging operation on the object with a pointer displayed within the desktop.

9. A GUI according to claim 1 wherein the application program is a monitoring program for an uninterruptible power supply.

10. A computer program product for displaying a graphical user interface (GUI) within a display device of a computer, wherein the computer includes an operating system executing therewithin, wherein a desktop is displayed within the display device by the operating system, the computer program product comprising a computer usable storage medium having computer readable program code means embodied in the medium, the computer readable program code means comprising:
   computer readable code means for displaying a first panel within the desktop, wherein the first panel comprises a display area configured to display information associated with an application program executing within the computer;
   computer readable code means for movably displaying a second panel within the desktop, wherein the second panel is positioned beneath the first panel and is movably associated therewith between a hidden position beneath the first panel and an exposed position adjacent the first panel;
   computer readable code means for displaying at least one GUI control on at least one of the first and second panels, wherein the at least one GUI control is configured to control display of information associated with the application program within the first panel display area, wherein the at least one GUI control is functionally independent of the operating system, wherein the at least one GUI control is configured to inherit at least one style property from the operating system; and
   computer readable code means for moving the second panel between the hidden and exposed positions in response to user input.

11. A computer program product according to claim 10 wherein the at least one GUI control comprises a plurality of GUI controls.

12. A computer program product according to claim 10 wherein the style property is selected from the group consisting of color, shape and typography.

13. A computer program product according to claim 10 wherein the second display panel comprises a set of GUI controls extending from a portion thereof that are visible to a user when the second panel is in both the hidden and exposed positions, wherein each GUI control in the set is functionally independent of the operating system, and wherein each GUI control in the set is configured to inherit at least one style property from the operating system.

14. A computer program product according to claim 13 wherein the style property is selected from the group consisting of color, shape and typography.

15. A computer program product according to claim 13 wherein the computer readable code means for moving the second panel between the hidden and exposed positions comprises computer readable code means for activating one of the GUI controls in the set.

16. A computer program product according to claim 10 further comprising an object positioned adjacent the first panel, wherein the object is movable between first and second positions, wherein the second panel is in the hidden position when the object is in the first position, wherein the second panel is in the exposed position when the object is in the second position, and wherein the computer readable code means for moving the second panel between the hidden and exposed positions comprises computer readable code means for moving the object between the first and second positions.

17. A computer program product according to claim 16 wherein the computer readable code means for moving the object between the first and second positions comprises computer readable code means for performing a dragging operation on the object with a pointer displayed within the desktop.

18. A computer program product according to claim 10 wherein the application program is a monitoring program for an uninterruptible power supply.

19. A method of displaying a graphical user interface (GUI) within a display device of a computer, wherein the computer includes an operating system executing therewithin, and wherein a desktop is displayed within the display device by the operating system, the method comprising the following steps:
   displaying a first panel within the desktop, wherein the first panel comprises a display area configured to display information associated with an application program executing within the computer;
   displaying a second panel within the desktop, wherein the second panel is positioned beneath the first panel and is movably associated therewith between a hidden position beneath the first panel and an exposed position adjacent the first panel;
   providing at least one GUI control on at least one of the first and second panels, wherein the at least one GUI control is configured to control display of information associated with the application program within the first panel display area, wherein the at least one GUI control is functionally independent of the operating system, and wherein the at least one GUI control is configured to inherit at least one style property from the operating system; and
   moving the second panel between the hidden and exposed positions in response to user input.

20. A method according to claim 19 wherein the at least one GUI control comprises a plurality of GUI controls.

21. A method according to claim 19 wherein the style property is selected from the group consisting of color, shape and typography.

22. A method according to claim 19 wherein the second display panel comprises a set of GUI controls extending from a portion thereof that are visible to a user when the second panel is in both the hidden and exposed positions, wherein each GUI control in the set is functionally independent of the operating system, and wherein each GUI control in the set is configured to inherit at least one style property from the operating system.

23. A method according to claim 22 wherein the style property is selected from the group consisting of color, shape and typography.

24. A method according to claim 22 wherein the step of moving the second panel between the hidden and exposed positions comprises activating one of the GUI controls in the set.

25. A method according to claim 19 further comprising an object positioned adjacent the first panel, wherein the object is movable between first and second positions, wherein the second panel is in the hidden position when the object is in the first position, wherein the second panel is in the exposed position when the object is in the second position, and wherein the step of moving the second panel between the hidden and exposed positions comprises moving the object between the first and second positions.

26. A method according to claim 25 wherein the step of moving the object between the first and second positions comprises performing a dragging operation on the object with a pointer displayed within the desktop.

27. A method according to claim 19 wherein the application program is a monitoring program for an uninterruptible power supply.

28. A data processing system, comprising:
 a computer in communication with an uninterruptible power supply (UPS) device, wherein the computer includes an operating system and a UPS device monitoring application program executing therewithin;
 a display device including a desktop displayed therewithin via the operating system; and
 a graphical user interface (GUI) associated with the UPS device monitoring application program displayed within the display device, wherein the GUI comprises:
  a first panel displayed within the desktop, wherein the first panel comprises a display area configured to display information associated with the UPS device monitoring application program;
  a second panel displayed within the desktop, wherein the second panel is positioned beneath the first panel and is movably associated therewith between a hidden position beneath the first panel and an exposed position adjacent the first panel;
  at least one GUI control on at least one of the first and second panels, wherein the at least one GUI control is configured to control display of information associated with the UPS device monitoring application program within the first panel display area, wherein the at least one GUI control is functionally independent of the operating system and is configured to inherit at least one style property from the operating system; and
  means for moving the second panel between the hidden and exposed positions in response to user input.

29. A data processing system according to claim 28 wherein the at least one GUI control comprises a plurality of GUI controls.

30. A data processing system according to claim 28 wherein the style property is selected from the group consisting of color, shape and typography.

31. A data processing system according to claim 28 wherein the second display panel comprises a plurality of tabs extending from a portion thereof that are visible to a user when the second panel is in both the hidden and exposed positions, and wherein each tab is configured to inherit at least one style property from the operating system.

32. A data processing system according to claim 31 wherein the style property is selected from the group consisting of color, shape and typography.

33. A data processing system according to claim 31 wherein the means for moving the second panel between the hidden and exposed positions comprises means for activating one of the plurality of tabs.

34. A data processing system according to claim 28 further comprising an object positioned adjacent the first panel, wherein the object is movable between first and second positions, wherein the second panel is in the hidden position when the object is in the first position, wherein the second panel is in the exposed position when the object is in the second position, and wherein the means for moving the second panel between the hidden and exposed positions comprises means for moving the object between the first and second positions.

35. A data processing system according to claim 34 wherein the means for moving the object between the first and second positions comprises means for performing a dragging operation on the object with a pointer displayed within the desktop.

36. A graphical user interface (GUI) for display within a display device of a computer, wherein the computer includes an operating system executing therewithin, and wherein a desktop is displayed within the display device by the operating system, the GUI comprising:
 means for displaying a first panel within the desktop, wherein the first panel comprises a display area configured to display information associated with an application program executing within the computer;
 means for movably displaying a second panel within the desktop, wherein the second panel is positioned beneath the first panel and is movably associated therewith between a hidden position beneath the first panel and an exposed position adjacent the first panel, wherein the second panel comprises a first set of GUI controls for controlling display of information within the first panel display area, wherein each GUI control in the first set is functionally independent of the operating system, and wherein the GUI controls in the first set are configured to inherit at least one style property from the operating system; and
 means for moving the second panel between the hidden and exposed positions in response to user input.

37. A GUI according to claim 36 wherein the style property is selected from the group consisting of color, shape and typography.

38. A GUI according to claim 36 wherein the second display panel comprises a second set of GUI controls extending from a portion thereof that are visible to a user when the second panel is in both the hidden and exposed positions, wherein each GUI control in the second set is functionally independent of the operating system, and wherein each GUI control in the second set is configured to inherit at least one style property from the operating system.

39. A GUI according to claim 38 wherein the style property is selected from the group consisting of color, shape and typography.

40. A GUI according to claim 38 wherein the means for moving the second panel between the hidden and exposed positions comprises means for activating one of the GUI controls in the second set.

41. A GUI according to claim 36 further comprising an object positioned adjacent the first panel, wherein the object is movable between first and second positions, wherein the second panel is in the hidden position when the object is in the first position, wherein the second panel is in the exposed position when the object is in the second position, and wherein the means for moving the second panel between the hidden and exposed positions comprises means for moving the object between the first and second positions.

42. A GUI according to claim 41 wherein the means for moving the object between the first and second positions comprises means for performing a dragging operation on the object with a pointer displayed within the desktop.

43. A GUI according to claim 36 wherein the application program is a monitoring program for an uninterruptible power supply.

44. A graphical user interface (GUI) for display within a display device of a computer, wherein the computer includes an operating system executing therewithin, and wherein a desktop is displayed within the display device by the operating system, the GUI comprising:

means for displaying a first panel within the desktop, wherein the first panel comprises a display area configured to display information associated with an application program executing within the computer;

means for movably displaying a second panel within the desktop, wherein the second panel is positioned beneath the first panel and is movably associated therewith between a hidden position beneath the first panel and an exposed position adjacent the first panel, wherein the second panel comprises a first set of GUI controls for controlling display of information within the first panel display area, wherein each GUI control in the first set is functionally independent of the operating system, wherein the second display panel comprises a second set of GUI controls extending from a portion thereof that are visible to a user when the second panel is in both the hidden and exposed positions, wherein each GUI control in the second set is functionally independent of the operating system, and wherein each GUI control in the second set is configured to inherit at least one style property from the operating system; and means for moving the second panel between the hidden and exposed positions in response to user input.

45. A GUI according to claim 44 wherein the style property is selected from the group consisting of color, shape and typography.

46. A GUI according to claim 44 wherein the style property is selected from the group consisting of color, shape and typography.

47. A GUI according to claim 44 wherein the means for moving the second panel between the hidden and exposed positions comprises means for activating one of the GUI controls in the second set.

48. A GUI according to claim 44 further comprising an object positioned adjacent the first panel, wherein the object is movable between first and second positions, wherein the second panel is in the hidden position when the object is in the first position, wherein the second panel is in the exposed position when the object is in the second position, and wherein the means for moving the second panel between the hidden and exposed positions comprises means for moving the object between the first and second positions.

49. A GUI according to claim 48 wherein the means for moving the object between the first and second positions comprises means for performing a dragging operation on the object with a pointer displayed within the desktop.

50. A GUI according to claim 44 wherein the application program is a monitoring program for an uninterruptible power supply.

51. A computer program product for displaying a graphical user interface (GUI) within a display device of a computer, wherein the computer includes an operating system executing therewithin, wherein a desktop is displayed within the display device by the operating system, the computer program product comprising a computer usable storage medium having computer readable program code means embodied in the medium, the computer readable program code means comprising:

computer readable code means for displaying a first panel within the desktop, wherein the first panel comprises a display area configured to display information associated with an application program executing within the computer;

computer readable code means for movably displaying a second panel within the desktop, wherein the second panel is positioned beneath the first panel and is movably associated therewith between a hidden position beneath the first panel and an exposed position adjacent the first panel, wherein the second panel comprises a first set of GUI controls for controlling display of information within the first panel display area, wherein each GUI control in the first set is functionally independent of the operating system, and wherein the GUI controls in the first set are configured to inherit at least one style property from the operating system; and computer readable code means for moving the second panel between the hidden and exposed positions in response to user input.

52. A computer program product according to claim 51 wherein the style property is selected from the group consisting of color, shape and typography.

53. A computer program product according to claim 51 wherein the second display panel comprises a second set of GUI controls extending from a portion thereof that are visible to a user when the second panel is in both the hidden and exposed positions, wherein each GUI control in the second set is functionally independent of the operating system, and wherein each GUI control in the second set is configured to inherit at least one style property from the operating system.

54. A computer program product according to claim 53 wherein the style property is selected from the group consisting of color, shape and typography.

55. A computer program product according to claim 53 wherein the computer readable code means for moving the second panel between the hidden and exposed positions comprises computer readable code means for activating one of the GUI controls in the second set.

56. A computer program product according to claim 51 further comprising an object positioned adjacent the first panel, wherein the object is movable between first and second positions, wherein the second panel is in the hidden position when the object is in the first position, wherein the second panel is in the exposed position when the object is in the second position, and wherein the computer readable code means for moving the second panel between the hidden and exposed positions comprises computer readable code means for moving the object between the first and second positions.

57. A computer program product according to claim 56 wherein the computer readable code means for moving the object between the first and second positions comprises computer readable code means for performing a dragging operation on the object with a pointer displayed within the desktop.

58. A computer program product according to claim 51 wherein the application program is a monitoring program for an uninterruptible power supply.

59. A computer program product for displaying a graphical user interface (GUI) within a display device of a computer, wherein the computer includes an operating system executing therewithin, wherein a desktop is displayed within the display device by the operating system, the computer program product comprising a computer usable storage medium having computer readable program code means embodied in the medium, the computer readable program code means comprising:

computer readable code means for displaying a first panel within the desktop, wherein the first panel comprises a display area configured to display information associated with an application program executing within the computer;

computer readable code means for movably displaying a second panel within the desktop, wherein the second panel is positioned beneath the first panel and is movably associated therewith between a hidden position beneath the first panel and an exposed position adjacent the first panel, wherein the second panel comprises a first set of GUI controls for controlling display of information within the first panel display area, wherein each GUI control in the first set is functionally independent of the operating system, wherein the second display panel comprises a second set of GUI controls extending from a portion thereof that are visible to a user when the second panel is in both the hidden and exposed positions, wherein each GUI control in the second set is functionally independent of the operating system, and wherein each GUI control in the second set is configured to inherit at least one style property from the operating system; and computer readable code means for moving the second panel between the hidden and exposed positions in response to user input.

60. A computer program product according to claim 59 wherein the style property is selected from the group consisting of color, shape and typography.

61. A computer program product according to claim 60 wherein the style property is selected from the group consisting of color, shape and typography.

62. A computer program product according to claim 60 wherein the computer readable code means for moving the second panel between the hidden and exposed positions comprises computer readable code means for activating one of the GUI controls in the second set.

63. A computer program product according to claim 60 further comprising an object positioned adjacent the first panel, wherein the object is movable between first and second positions, wherein the second panel is in the hidden position when the object is in the first position, wherein the second panel is in the exposed position when the object is in the second position, and wherein the computer readable code means for moving the second panel between the hidden and exposed positions comprises computer readable code means for moving the object between the first and second positions.

64. A computer program product according to claim 63 wherein the computer readable code means for moving the object between the first and second positions comprises computer readable code means for performing a dragging operation on the object with a pointer displayed within the desktop.

65. A computer program product according to claim 60 wherein the application program is a monitoring program for an uninterruptible power supply.

66. A graphical user interface (GUI) for display within a display device of a computer, wherein the computer includes an operating system executing therewithin, and wherein a desktop is displayed within the display device by the operating system, the GUI comprising:

means for displaying a first panel within the desktop, wherein the first panel comprises a display area configured to display information associated with an application program executing within the computer;

means for movably displaying a second panel within the desktop, wherein the second panel is positioned beneath the first panel and is movably associated therewith between a hidden position beneath the first panel and an exposed position adjacent the first panel, wherein the second panel comprises a first set of GUI controls for controlling display of information within the first panel display area, and wherein each GUI control in the first set is functionally independent of the operating system;

an object positioned adjacent the first panel, wherein the object is movable between first and second visible positions, wherein the second panel is in the hidden position when the object is in the first visible position, and wherein the second panel is in the exposed position when the object is in the second visible position; and means for moving the second panel between the hidden and exposed positions in response to user input, comprising means for moving the object between the first and second visible positions.

67. A GUI according to claim 66 wherein the GUI controls in the first set are configured to inherit at least one style property from the operating system.

68. A GUI according to claim 67 wherein the style property is selected from the group consisting of color, shape and typography.

69. A GUI according to claim 66 wherein the second display panel comprises a second set of GUI controls extending from a portion thereof that are visible to a user when the second panel is in both the hidden and exposed positions, wherein each GUI control in the second set is functionally independent of the operating system, and wherein each GUI control in the second set is configured to inherit at least one style property from the operating system.

70. A GUI according to claim 69 wherein the style property is selected from the group consisting of color, shape and typography.

71. A GUI according to claim 69 wherein the means for moving the second panel between the hidden and exposed positions comprises means for activating one of the GUI controls in the second set.

72. A GUI according to claim 71 wherein the means for moving the object between the first and second positions comprises means for performing a dragging operation on the object with a pointer displayed within the desktop.

73. A GUI according to claim 66 wherein the application program is a monitoring program for an uninterruptible power supply.

74. A computer program product for displaying a graphical user interface (GUI) within a display device of a computer, wherein the computer includes an operating system executing therewithin, wherein a desktop is displayed within the display device by the operating system, the computer program product comprising a computer usable storage medium having computer readable program code means embodied in the medium, the computer readable program code means comprising:

computer readable code means for displaying a first panel within the desktop, wherein the first panel comprises a display area configured to display information associated with an application program executing within the computer;

computer readable code means for movably displaying a second panel within the desktop, wherein the second panel is positioned beneath the first panel and is movably associated therewith between a hidden position beneath the first panel and an exposed position adjacent the first panel, wherein the second panel comprises a first set of GUI controls for controlling display of information within the first panel display area, wherein each GUI control in the first set is functionally independent of the operating system;

computer readable code means for positioning an object adjacent the first panel, wherein the object is movable between first and second visible positions, wherein the second panel is in the hidden position when the object is in the first visible position, and wherein the second panel is in the exposed position when the object is in the second visible position; and computer readable code means for moving the second panel between the hidden and exposed positions in response to user input, comprising computer readable code means for moving the object between the first and second visible positions.

75. A computer program product according to claim 74 wherein the GUI controls in the first set are configured to inherit at least one style property from the operating system.

76. A computer program product according to claim 75 wherein the style property is selected from the group consisting of color, shape and typography.

77. A computer program product according to claim 75 wherein the second display panel comprises a second set of GUI controls extending from a portion thereof that are visible to a user when the second panel is in both the hidden and exposed positions, wherein each GUI control in the second set is functionally independent of the operating system, and wherein each GUI control in the second set is configured to inherit at least one style property from the operating system.

78. A computer program product according to claim 77 wherein the style property is selected from the group consisting of color, shape and typography.

79. A computer program product according to claim 77 wherein the computer readable code means for moving the second panel between the hidden and exposed positions comprises computer readable code means for activating one of the GUI controls in the second set.

80. A computer program product according to claim 74 wherein the computer readable code means for moving the object between the first and second positions comprises computer readable code means for performing a dragging operation on the object with a pointer displayed within the desktop.

81. A computer program product according to claim 74 wherein the application program is a monitoring program for an uninterruptible power supply.

* * * * *

UNITED STATES PATENT AND TRADEMARK OFFICE
CERTIFICATE OF CORRECTION

PATENT NO.    : 6,356,284 B1
DATED         : March 12, 2002
INVENTOR(S)   : Manduley et al.

It is certified that error appears in the above-identified patent and that said Letters Patent is hereby corrected as shown below:

<u>Column 18,</u>
Line 7, should read:
-- 77.   A computer program product according to claim 74 --

Signed and Sealed this

First Day of October, 2002

Attest:

JAMES E. ROGAN
Attesting Officer    Director of the United States Patent and Trademark Office